United States Patent
Ito

(10) Patent No.: US 8,509,543 B2
(45) Date of Patent: Aug. 13, 2013

(54) SUBJECT TRACKING DEVICE AND CAMERA

(75) Inventor: Yuichi Ito, Tokyo (JP)

(73) Assignee: Nikon Corporation, Tokyo (JP)

(*) Notice: Subject to any disclaimer, the term of this patent is extended or adjusted under 35 U.S.C. 154(b) by 330 days.

(21) Appl. No.: 12/792,403

(22) Filed: Jun. 2, 2010

(65) Prior Publication Data
US 2010/0310127 A1    Dec. 9, 2010

(30) Foreign Application Priority Data
Jun. 8, 2009    (JP) ................ 2009-137023

(51) Int. Cl.
*G06K 9/62*    (2006.01)
(52) U.S. Cl.
USPC ........................................ 382/215
(58) Field of Classification Search
USPC ................ 382/103, 209, 220, 215
See application file for complete search history.

(56) References Cited

U.S. PATENT DOCUMENTS

| | | | | |
|---|---|---|---|---|
| 6,574,353 | B1* | 6/2003 | Schoepflin et al. | 382/103 |
| 6,687,386 | B1* | 2/2004 | Ito et al. | 382/103 |
| 7,113,616 | B2* | 9/2006 | Ito et al. | 382/103 |
| 8,131,014 | B2* | 3/2012 | Abe | 382/103 |
| 8,135,172 | B2* | 3/2012 | Ike et al. | 382/103 |
| 2008/0100709 | A1* | 5/2008 | Furukawa | 348/169 |

FOREIGN PATENT DOCUMENTS

| | | |
|---|---|---|
| JP | A-06-083963 | 3/1994 |
| JP | A-07-271981 | 10/1995 |
| JP | A-09-102015 | 4/1997 |
| JP | A-2001-060269 | 3/2001 |
| JP | A-2008-113071 | 5/2008 |
| WO | WO 2007099762 A1 * | 9/2007 |

OTHER PUBLICATIONS

Japanese Office Action issued in Japanese Application No. 2009-137023 dated Apr. 19, 2011 (with translation).

* cited by examiner

*Primary Examiner* — Samir Ahmed
*Assistant Examiner* — Totam Le
(74) *Attorney, Agent, or Firm* — Oliff & Berridge, PLC

(57) ABSTRACT

A subject tracking device includes: an input unit that sequentially inputs input images; an arithmetic operation unit that calculates a first similarity level between an initial template image and a target image and a second similarity level between an update template image and the target image; a position determining unit that determines a subject position based upon at least one of the first and the second similarity level; a decision-making unit that decides whether or not to update the update template image based upon the first and the second similarity level; and an update unit that generates a new update template image based upon the initial template image multiplied by a first weighting coefficient and the target image multiplied by a second weighting coefficient, and updates the update template image with the newly generated update template image, if the update template image is decided to be updated.

4 Claims, 3 Drawing Sheets

SUBJECT TRACKING DEVICE AND CAMERA

INCORPORATION BY REFERENCE

The disclosure of the following priority application is herein incorporated by reference:

Japanese Patent Application No. 2009-137023 filed Jun. 8, 2009

BACKGROUND OF THE INVENTION

1. Field of the Invention

The present invention relates to a subject tracking device and a camera.

2. Description of Related Art

Japanese Laid Open Patent Publication No. 2001-060269 discloses an object tracking device that executes template matching by using a plurality of template images different from one another and all related to a photographic subject, and that updates the template image based upon the template image achieving the highest level of similarity, so as to successfully track the photographic subject even as it goes through changes.

SUMMARY OF THE INVENTION

However, as the object tracking device in the related art repeatedly updates the template images, the difference between the template images used in template matching and the initial template images gradually becomes greater. As a result, a photographic subject other than the initial tracking target subject may be erroneously tracked.

According to the 1st aspect of the present invention, A subject tracking device, comprises: an input unit that sequentially inputs images obtained through imaging operation each as an input image; an arithmetic operation unit that individually calculates a first similarity level and a second similarity level, the first similarity level indicating similarity between an initial template image which is not to be updated and a target image set within the input image and the second similarity level indicating similarity between an update template image that is to be updated and the target image; a position determining unit that determines a subject position within the input image based upon at least one of the first similarity level and the second similarity level; a decision-making unit that makes a decision as to whether or not to update the update template image based upon the first similarity level and the second similarity level; and an update unit that generates a new update template image based upon pixel information expressing the initial template image multiplied by a first weighting coefficient, and pixel information expressing the target image multiplied by a second weighting coefficient, and updates the update template image with the newly generated update template image, if the decision-making unit decides that the update template image is to be updated.

According to the 2nd aspect of the present invention, it is preferred that in the subject tracking device according to the 1st aspect, the position determining unit determines a position of the target image within the input image as the subject position within the input image, the target image corresponding to a highest similarity level among the first similarity levels and the second similarity levels calculated by the arithmetic operation unit.

According to the 3rd aspect of the present invention, it is preferred that in the subject tracking device according to the 2nd aspect, the decision-making unit decides that the update template image is to be updated if the highest similarity level is equal to or higher than a predetermined level.

According to the 4th aspect of the present invention, it is preferred that in the subject tracking device according to the 2nd aspect, the update unit makes a decision as to whether the highest similarity level is the first similarity level or the second similarity level, and adjusts the first weighting coefficient and the second weighting coefficient based upon decision-making results.

According to the 5th aspect of the present invention, it is preferred that in the subject tracking device according to the 4th aspect, if the highest similarity level is decided to be the first similarity level, the update unit sets a greater value for the first weighting coefficient than the second weighting coefficient, whereas if the highest similarity level is decided to be the second similarity level, the update unit sets a greater value for the second weighting coefficient than the first weighting coefficient.

According to the 6th aspect of the present invention, it is preferred that in the subject tracking device according to the 1st aspect, the update unit generates the new update template image by adding up pixel information expressing the initial template image multiplied by the first weighting coefficient and pixel information expressing the target image multiplied by the second weighting coefficient.

According to the 7th aspect of the present invention, a camera is equipped with a subject tracking device according to the 1st aspect.

DESCRIPTION OF PREFERRED EMBODIMENT

Figure 1:
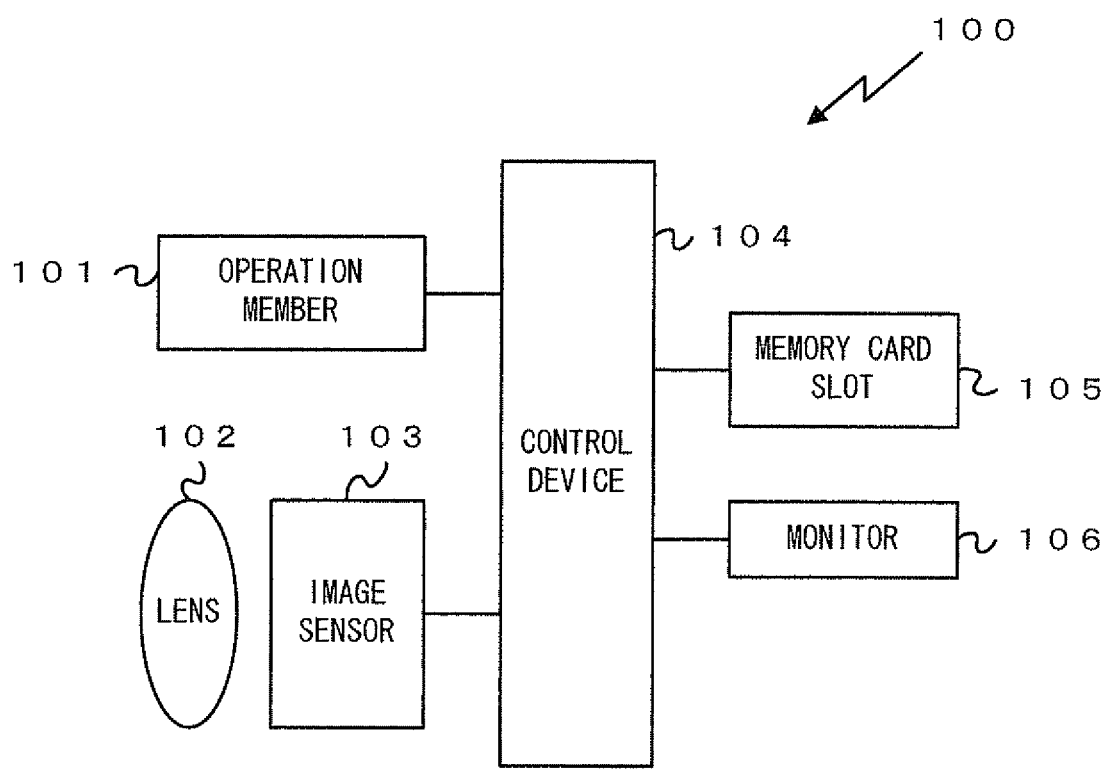
FIG. 1 is a block diagram showing the structure adopted in a camera 100 achieved in an embodiment.

FIG. 1 is a block diagram showing the structure adopted in a camera achieved in an embodiment. The camera 100 comprises an operation member 101, a lens 102, an image sensor 103, a control device 104, a memory card slot 105 and a monitor 106. The operation member 101 includes various input members operated by the user, such as a power button, a shutter release button, a zoom button, a cross key, an OK button, a reproduce button and a delete button.

While the lens 102 is constituted with a plurality of optical lenses, the plurality of optical lenses are represented by a single lens in FIG. 1. The image sensor 103, which may be, for instance, a CCD image sensor or a CMOS image sensor, captures a subject image formed through the lens 102. The image sensor 103 then outputs image signals expressing the image having been captured to the control device 104.

Based upon the image signals input thereto from the image sensor 103, the control device 104 generates image data (hereafter referred to as "main image data") in a predetermined image format such as the PEG format. In addition, based upon the image data thus created, the control device 104 generates display image data such as thumbnail image data. The control device 104 then creates an image file that contains the main image data and the thumbnail image data having been generated as well as additional header information, and outputs the image file to the memory card slot 105.

The image file output from the control device 104 is written and thus recorded into a memory card that is loaded at the memory card slot 105 and is utilized as a storage medium. In addition, in response to an instruction issued by the control device 104, an image file stored within a memory card loaded into the memory card slot 105 is read out.

The monitor 106 is a liquid crystal monitor (rear side monitor) mounted at the rear surface of the camera 100. At the monitor 106, an image stored in the memory card, a setting menu in which settings for the camera 100 are selected, or the like is brought up on display. In addition, as the user sets the camera 100 in a photographing mode, the control device 104 outputs, to the monitor 106, display image data for images obtained in time series from the image sensor 103. As a result, a live image is displayed at the monitor 106.

The control device 104, constituted with a CPU, a memory and other peripheral circuits, controls the camera 100. It is to be noted that the memory constituting the control device 104 includes an SDRAM and a flash memory. The SDRAM, which is a volatile memory, is used by the CPU as a work memory where a program to be executed is opened or as a buffer memory where data are temporarily recorded. In the flash memory, which is a non-volatile memory, program data related to the program executed by the control device 104, various parameters that are read during program execution and the like are recorded.

The control device 104 in the embodiment executes template matching processing for each frame of live image input from the image sensor 103 in reference to a template image prepared in advance. The control device 104 identifies an image area within the frame manifesting similarity to the template image. The control device 104 then executes subject tracking processing through frame-to-frame tracking of the identified area.

It is to be noted that a detailed description is not provided with regard to a similarity calculation method that may be adopted when calculating the level of similarity between the template image and the target image, which may be determined through any of the standard calculation methods in the known art such as the SAD (sum of absolute differences) method or the SSD (sum of squared differences) method. For instance, the control device 104 calculating the similarity level through the SAD (sum of absolute differences) method will determine a similarity factor by calculating sums of absolute differences and execute template matching based upon the similarity factor value thus calculated. In such a case, the similarity factor having been calculated will take a smaller value if the level of similarity between the template image and the target image is higher, and will take on a greater value if the level of similarity between the template image and the target image is lower.

The following issue needs to be addressed when tracking the photographic subject by calculating the level of similarity between the template image and the target image as described above, since the shape of the tracking target subject is likely to change constantly over time. Namely, if a template image prepared in advance is continuously used in the similarity factor value calculation, the level of similarity between the template image and the target image will become lower as the shape of the subject changes, which may ultimately result in loss of subject tracking. In order to continuously execute the template matching operation even as the shape of the subject changes by effectively addressing this issue, the control device 104 in the embodiment updates the template image during the template matching operation.

It is to be noted that as the control device 104 repeatedly updates the template image, the template image may be updated with an image of a subject other than the tracking target subject. In order to prevent such an erroneous update, the control device 104 in the embodiment executes template matching processing by using two template images; an update template image that is updated during the process of template matching and an initial template image that is not updated and thus remains unchanged through the process of template matching. Thus, as the update template image is updated as necessary, the template matching processing can be executed even if the shape of the subject changes. In addition, the use of the initial template image allows the subject tracking operation to be continuously executed without losing the photographic subject that is initially set as the tracking target.

Figure 2:
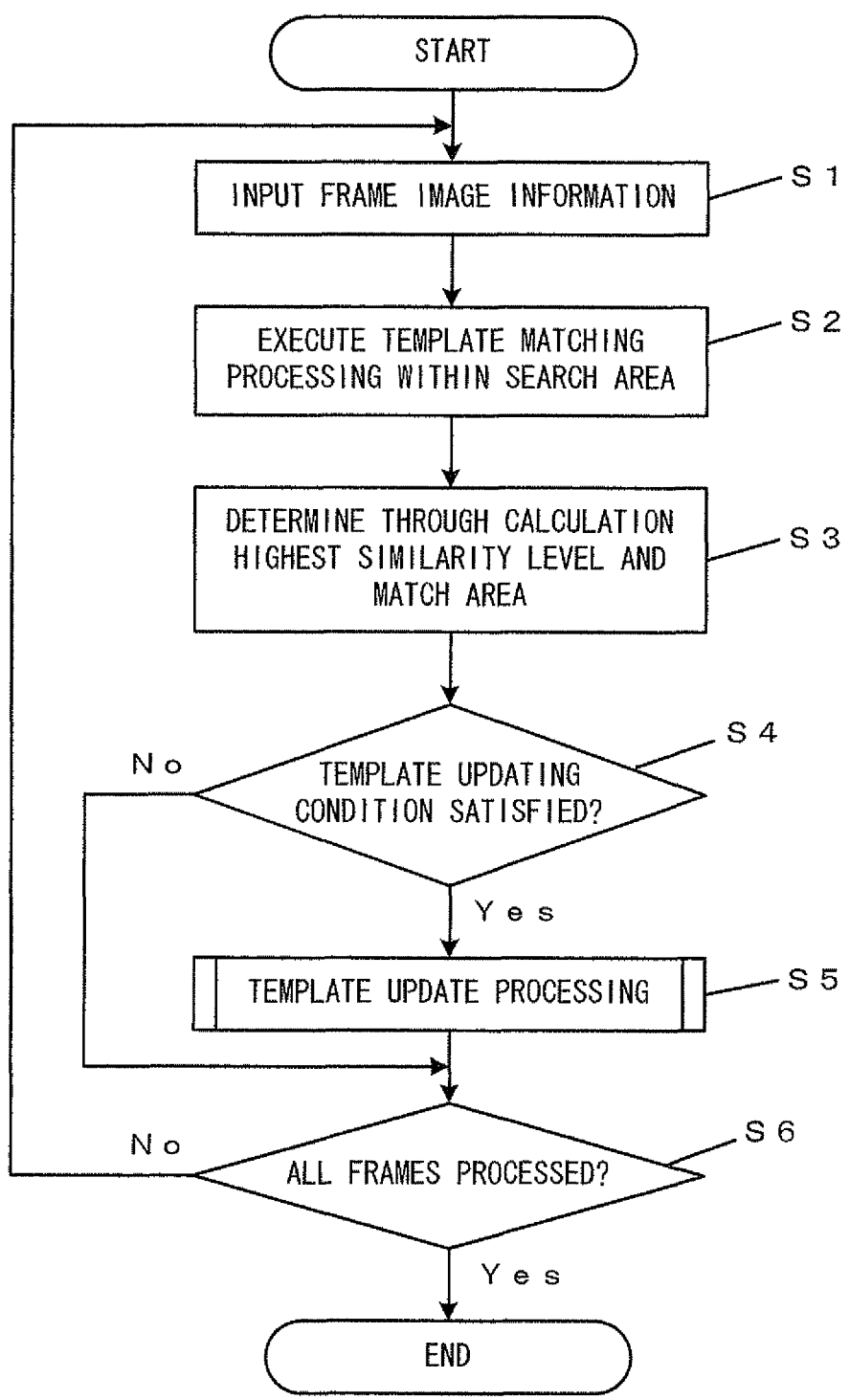
FIG. 2 presents a flowchart of subject tracking processing.

FIG. 2 presents a flowchart of the subject tracking processing executed in the embodiment. The processing in FIG. 2 is executed by the control device 104 based upon a program started up as a sequential live image input from the image sensor 103 starts.

In step S1, the control device 104 reads frame image information for a single frame of live image and then the operation proceeds to step S2. In step S2, the control device 104 executes template matching by calculating similarity factor values indicating the levels of similarity between the target image and the initial template image and between the target image and the update template image at each position assumed by a search area as the control device 104 shifts the search area within the frame. The operation then proceeds to step S3.

In step S3, the control device 104 identifies the search area position where the minimum similarity factor value is calculated. The minimum similarity factor value is the smallest similarity factor value among the similarity factor values indicating the levels of similarity between the initial template image and the target images at various search area positions and the similarity factor values indicating the levels of similarity between the update template image and the target images at the various search area positions having been calculated in step S2. The control device 104 then designates the area within the search area assuming the identified search area position as a match area. The operation then proceeds to step S4.

In step S4, the control device 104 makes a decision as to whether the minimum similarity factor value having been determined in step S3 satisfies an updating condition for updating the update template image. The control device 104 in the embodiment judges in this step that the updating condition for updating the update template image is satisfied if the minimum similarity factor value is smaller than a preselected threshold value, i.e., if the highest level of similarity manifested by the target image and the template image is equal to or higher than a predetermined level. If an affirmative decision is made in step S4, the operation proceeds to step S5 to update the update template image by executing the template update processing to be described later in reference to FIG. 3, and then the operation proceeds to step S6. However, if a negative decision is made in step S4, operation at the control device 104 proceeds to step S6 without updating the update template image.

In step S6, the control device 104 makes a decision as to whether or not the processing for all the frames of live images has ended, i.e., whether or not the live image input from the image sensor 103 has ended. If the control device 104 makes a negative decision in step S6, the operation returns to step S1 to repeat the processing described above for the frame input next. If, on the other hand, an affirmative decision is made in step S6, the control device 104 ends the processing.

Figure 3:
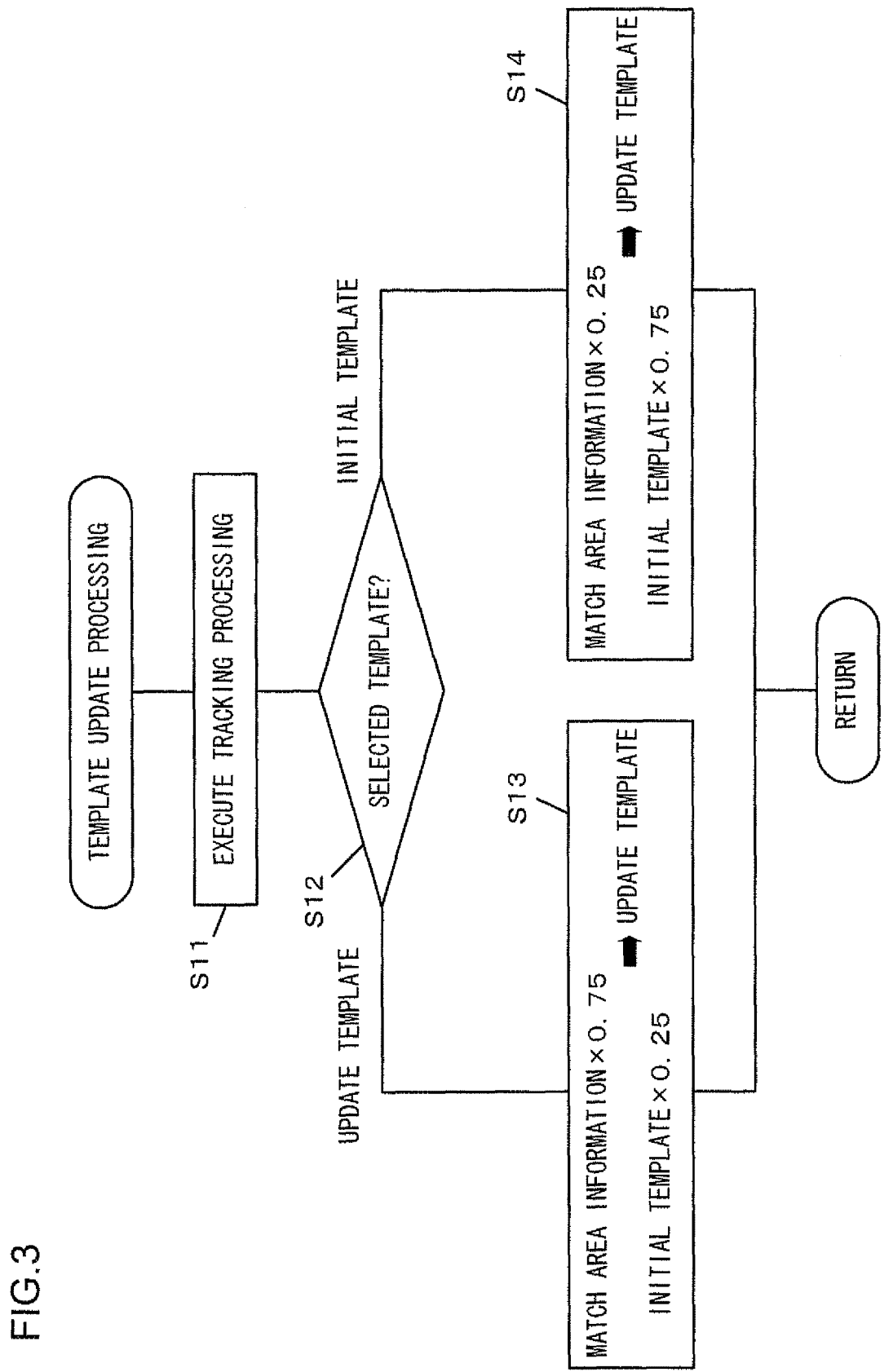
FIG. 3 presents a flowchart of template update processing.

Next, the template update processing executed in step S5 is described in reference to the flowchart presented in FIG. 3. In step S11, the control device 104 executes subject tracking processing by designating the match area having been determined in step S3 in FIG. 2 as the subject position within the frame. The operation subsequently proceeds to step S12 in which the control device 104 makes a decision as to whether the minimum similarity factor value has been calculated in step S4 in correspondence to the initial template image or the update template image.

Upon judging in step S12 that the minimum similarity factor value has been calculated in correspondence to the update template image, the control device 104 proceeds to step S13. In step S13, the control device 104 generates a new update template image by adding up, i.e., combining, the pixel information for the target image within the match area multiplied by a first weighting coefficient and the pixel information for the initial template image multiplied by a second weighting coefficient. The control device 104 then updates the update template image recorded in the SDRAM with the image thus generated before returning to the processing shown in FIG. 2.

The target image and the initial template image as described above are both expressed with data sliced out in correspondence to the tracking target subject and thus, the volumes of information held therein are not very different from each other. Accordingly, by combining these two images, an image similar to the tracking target subject can be generated. An advantage of using the image generated by combining the two images as described above as the new update template image is that the use of the combination template containing a plurality of sets of subject information enables robust tracking of even a highly dynamic subject as the shape of the subject changes. When the subject is highly dynamic, the level of correlation between the set of subject information in a given frame of image and the set of subject information in the next frame of image is low. For this reason, the subject may become lost if it is tracked by using a template sliced out from the immediately-preceding frame instead of a combination template. However, since the combination template is used as described above, the control device 104 in the embodiment never loses track of the target subject.

It is to be noted that the first weighting coefficient and the second weighting coefficient are set so that their sum takes a value of 1. For instance, the first weighting coefficient may be set to 0.75 and the second weighting coefficient may be set to 0.25.

If the minimum similarity factor value has been calculated in correspondence to the update template image, the current shape of the subject is highly likely to have been greatly altered from the shape of the subject in the initial template image. Accordingly, the control device 104 generates an update template image effectively reflecting the current shape of the subject by setting a large value for the first weighting coefficient by which the update template image pixel information is to be multiplied. In addition, the control device 104 also incorporates the initial template image pixel information multiplied by the second weighting coefficient assuming a smaller value, so as to ensure that the new update template image does not become too different from the initial template image.

If, on the other hand, the control device 104 judges in step S12 that the minimum similarity factor value has been calculated in correspondence to the initial template image, the operation proceeds to step S14. In step S14, the control device 104 generates a new update template image by adding up, i.e., combining, the pixel information for the image within the match area multiplied by a third weighting coefficient and the pixel information for the initial template image multiplied by a fourth weighting coefficient. The control device 104 then updates the update template image recorded in the SDRAM with the image thus generated before returning to the processing shown in FIG. 2. The third weighting coefficient and the fourth weighting coefficient are set so that their sum takes a value of 1. For instance, the third weighting coefficient may be set to 0.25 and the fourth weighting coefficient may be set to 0.75.

If the minimum similarity factor value has been calculated in correspondence to the initial template image, the current shape of the subject is highly likely to have remained largely unchanged from the shape of the subject in the initial template image. Accordingly, the control device 104 ensures that the update template image to be newly generated will be more similar to the initial template image by setting a large value for the fourth weighting coefficient by which the initial template image pixel information is to be multiplied. In addition, the control device 104 also incorporates the update template image pixel information multiplied by the third weighting coefficient assuming a smaller value, so as to ensure that the new update template image will be generated by factoring in the effect of any change occurring in the shape of the subject over time.

The following advantages are achieved through the embodiment described above.

(1) The control device 104 sequentially takes in as input images the images captured via the image sensor 103. In correspondence to each input image, the control device 104 calculates a similarity factor value indicating the level of similarity between the initial template image and each target image set within the input image and a similarity factor value indicating the level of similarity between the update template image and the target image and determines the subject position within the input image based upon the calculated similarity factor values. The control device 104 then makes a decision as to whether or not the similarity factor value calculated in correspondence to the subject position satisfies the updating condition for updating the update template image. If the similarity factor value is judged to satisfy the updating condition, the control device 104 generates a new update template image based upon the initial template image pixel information multiplied by a weighting coefficient and the target image pixel information multiplied by a weighting coefficient. In other words, the control device 104 generates the new update template image by adding up the initial template image pixel information multiplied by a weighting coefficient and the target image pixel information multiplied by a weighting coefficient. The control device 104 then updates the update template image recorded in the SDRAM with the newly generated update template image. Through these measures, the subject can be continuously tracked without ever losing track of the target subject even as the shape of the subject changes.

(2) The control device 104 designates the target image position determined through arithmetic operation to achieve the highest level of similarity as the subject position within the input image. Thus, the subject position can be determined with a high level of accuracy.

(3) If the minimum similarity factor value is smaller than a preset threshold value, i.e., if the highest level of similarity between the target image and the template image is equal to or higher than a predetermined level, the control device 104 determines that the update template image is to be updated. Thus, since the update template image is updated only under conditions in which the tracking target subject is being tracked with a high level of reliability, it is ensured that a new update template image containing a photographic subject other than the initial tracking target subject is never generated.

(4) The control device 104 makes a decision as to whether the template image in correspondence to which the minimum similarity factor value has been calculated is the initial template image or the update template image. Based upon the decision-making results, the control device 104 adjusts the weighting coefficient by which the initial template image pixel information is to be multiplied and the weighting coefficient by which the target image pixel information is to be multiplied. Through these measures, it is ensured that the update template image never becomes too different from the initial template image while reliably tracking the subject even as its shape changes.

(5) If the minimum similarity factor value has been calculated in correspondence to the initial template image, the control device 104 sets a greater value for the fourth weighting coefficient by which the initial template image pixel information is to be multiplied than the value set for the third weighting coefficient by which the target image pixel information is to be multiplied. As a result, when the minimum similarity factor value is calculated in correspondence to the initial template image, an update template image effectively reflecting the current shape of the photographic subject can be generated, while ensuring that the new update template image does not become too different from the initial template image.

(6) If the minimum similarity factor value has been calculated in correspondence to the update template image, the control device 104 sets a greater value for the first weighting coefficient by which the target image pixel information is to be multiplied than the value set for the second weighting coefficient by which the initial template image pixel information is to be multiplied. As a result, a new template image more similar to the initial template image can be generated while ensuring that the subject is tracked reliably even as its shape changes over time.

—Variations—

It is to be noted that the camera achieved in the embodiment described above allows for the following variations.

(1) The control device 104 in the embodiment described above executes subject tracking for live images. However, the present invention is not limited to this example and provided that the camera 100 is equipped with a movie image photographing function, the control device 104 may execute frame-to-frame subject tracking for the frames of images constituting a movie image that has already been photographed, instead of live images.

(2) In the embodiment described above, the control device 104 in the camera 100 executes subject tracking through the processing executed as shown in FIGS. 2 and 3. However, a program based upon which the processing in FIGS. 2 and 3 is executed may be recorded in another terminal such as a personal computer so as to enable the terminal to execute the processing. In such a case, processing may be executed on movie image data expressing a movie image photographed in the camera and taken into the terminal so as to execute frame-to-frame subject tracking for the frames of images constituting the movie image. In addition, the present invention may also be adopted in a camera-equipped portable telephone or the like.

The above described embodiment is an example and various modifications can be made without departing from the scope of the invention.

What is claimed is:

1. A subject tracking device, comprising:
   an input unit that sequentially inputs images obtained through imaging operation each as an input image;
   an arithmetic operation unit that calculates first similarity levels and second similarity levels, the first similarity levels indicating similarity between an initial template image that is not to be updated and each of a plurality of image areas within the input image and the second similarity levels indicating similarity between an update template image that is to be updated and each of the plurality of image areas;
   a determining unit that determines a highest similarity level among the first similarity levels and the second similarity levels calculated by the arithmetic operation unit, and identifies the image area within the input image corresponding to the highest similarity level as a target image;
   a decision-making unit that makes a decision as to whether or not to update the update template image based upon the highest similarity level; and
   an update unit that generates a new update template image by adding the initial template image multiplied by a first weighting coefficient, and the target image multiplied by a second weighting coefficient, and updates the update template image with the newly generated update template image, if the decision-making unit decides that the update template image is to be updated, wherein:
   if the highest similarity level is one of the first similarity levels, the update unit sets a greater value for the first weighting coefficient than the second weighting coefficient, and
   if the highest similarity level is one of the second similarity levels, the update unit sets a greater value for the second weighting coefficient than the first weighting coefficient.

2. The subject tracking device according to claim 1, wherein:
   the decision-making unit decides that the update template image is to be updated if the highest similarity level is equal to or higher than a predetermined level.

3. The subject tracking device according to claim 1, wherein:
   the update unit makes a decision as to whether the highest similarity level is the first similarity level or the second similarity level, and adjusts the first weighting coefficient and the second weighting coefficient based upon decision-making results.

4. A camera equipped with a subject tracking device according to claim 1.

* * * * *